(12) United States Patent
Manet et al.

(10) Patent No.: US 8,463,763 B2
(45) Date of Patent: Jun. 11, 2013

(54) METHOD AND TOOL FOR SEARCHING IN SEVERAL DATA SOURCES FOR A SELECTED COMMUNITY OF USERS

(75) Inventors: Julien Manet, Grenade (FR); Marina Riou, Pibrac (FR); Lionel Dejean, Salvetat-St-Gilles (FR)

(73) Assignee: Airbus, Blagnac (FR)

( * ) Notice: Subject to any disclaimer, the term of this patent is extended or adjusted under 35 U.S.C. 154(b) by 545 days.

(21) Appl. No.: 11/995,176

(22) PCT Filed: Jul. 5, 2006

(86) PCT No.: PCT/FR2006/001595
§ 371 (c)(1),
(2), (4) Date: Jan. 9, 2008

(87) PCT Pub. No.: WO2007/006913
PCT Pub. Date: Jan. 18, 2007

(65) Prior Publication Data
US 2008/0270385 A1    Oct. 30, 2008

(30) Foreign Application Priority Data

Jul. 11, 2005    (FR) ...................................... 05 07409

(51) Int. Cl.
*G06F 17/30* (2006.01)

(52) U.S. Cl.
USPC ......................................... 707/706; 707/758

(58) Field of Classification Search
USPC .............................................. 707/706, 758
See application file for complete search history.

(56) References Cited

U.S. PATENT DOCUMENTS

| | | | |
|---|---|---|---|
| 6,058,391 A | 5/2000 | Gardner | |
| 6,134,549 A | 10/2000 | Regnier et al. | |
| 6,879,972 B2 * | 4/2005 | Brandon et al. | 706/45 |
| 2002/0001395 A1 * | 1/2002 | Davis et al. | 382/100 |
| 2002/0129062 A1 * | 9/2002 | Luparello | 707/513 |
| 2002/0156917 A1 * | 10/2002 | Nye | 709/238 |
| 2003/0009497 A1 * | 1/2003 | Yu | 707/513 |
| 2003/0028596 A1 * | 2/2003 | Toyota et al. | 709/204 |
| 2003/0084032 A1 * | 5/2003 | Grewal et al. | 707/3 |
| 2004/0243582 A1 * | 12/2004 | Sasaki et al. | 707/9 |
| 2005/0108271 A1 * | 5/2005 | Hurmiz et al. | 707/102 |

OTHER PUBLICATIONS

Chaudhuri, Surajit et al., "An Overview of Data Warehousing and OLAP Technology", Sigmod Record, vol. 26, No. 1, pp. 65-74, 1997.
Mostardi, Tommaso et al., "An Overview of WIND (Wide Interoperable Networked Databases)", System Sciences, vol. II, pp. 216-225, 1994.
Office Action issued Jun. 26, 2012 in Japanese Application No. 2008-520909 (With English Translation).

* cited by examiner

*Primary Examiner* — Son T Hoang
(74) *Attorney, Agent, or Firm* — Oblon, Spivak, McClelland, Maier & Neustadt, L.L.P.

(57) ABSTRACT

A method of searching for information contents in a plurality of data sources each including metadata structured according to a structure, the information contents being intended for at least one community of users. The method includes a step of first defining at least one reading screen specific to the community of users, the at least one reading screen including at least one category of results ordered as a function of the structure of at least one metadata, the step of defining the at least one reading screen including a step of second defining a correspondence rule between the at least one category and the at least one metadata for associating information contents to the at least one category, and a step of using the defined at least one reading screen as a search filter and/or display format in a search conducted in the plurality of data sources for the community of users.

11 Claims, 5 Drawing Sheets

Figure 1:
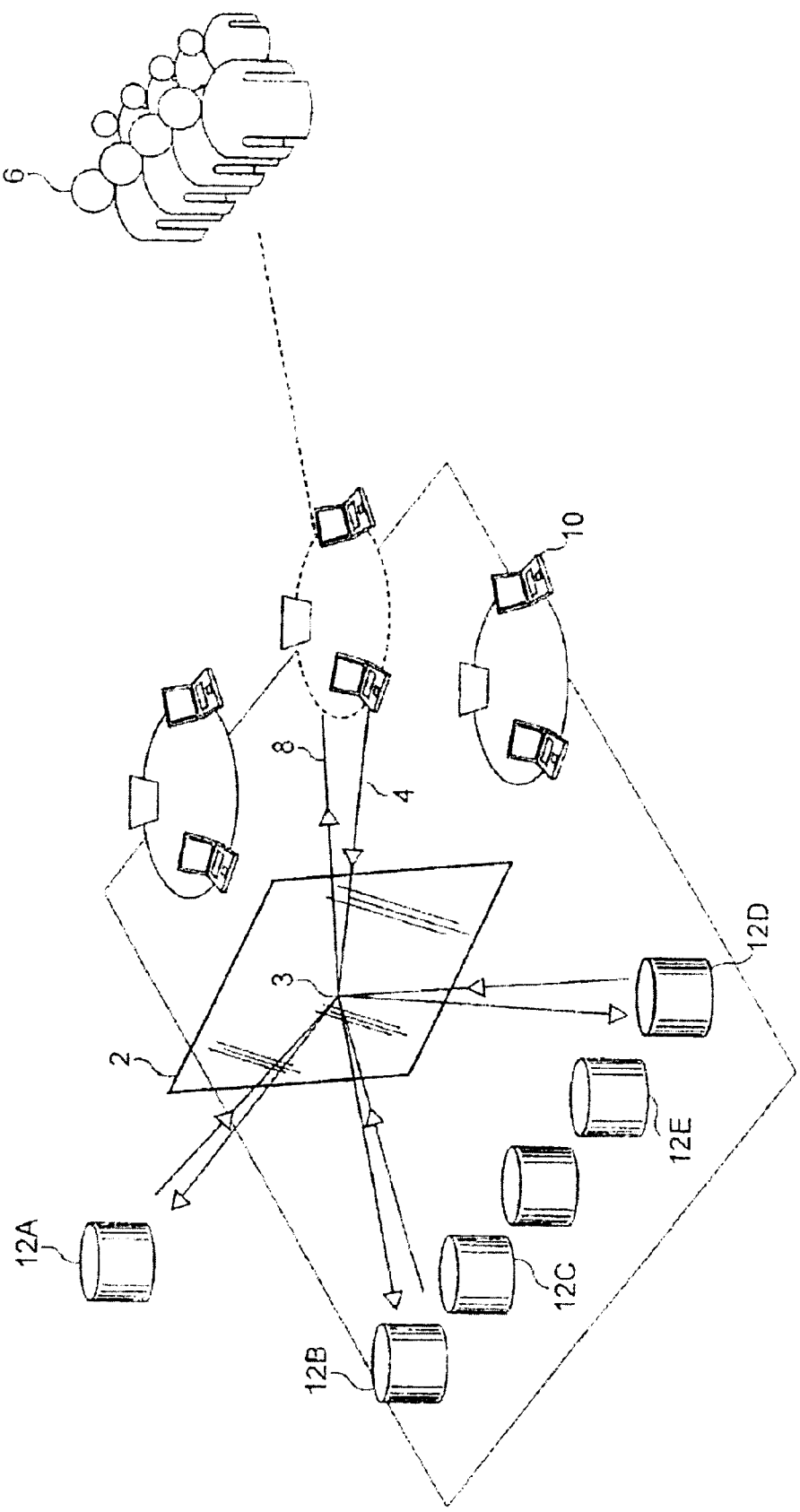

METHOD AND TOOL FOR SEARCHING IN SEVERAL DATA SOURCES FOR A SELECTED COMMUNITY OF USERS

The present invention relates to searching for information in several data sources for a chosen community of users. More particularly, it relates to searching in heterogeneous data sources that do not have a common data structure for the said community of users.

It is generally applicable in the discipline of knowledge searching and management (knowledge management) for the benefit of a community of users who share a skill, a center of interest or an expertise and who wish to search for information in several data sources.

Search tools based on document categories and/or keywords are already known.

In general, the categories are predefined manually or are constructed on the fly during the search.

The pertinence of the results is relatively insufficient, inasmuch as the categories used are most often too general and not very pertinent, especially for a community of users having highly developed expertise.

The present invention remedies this disadvantage.

It is aimed at providing a search tool that uses preestablished reading screens that are specific to one or more chosen communities of users.

In this way, for a given community of users, it offers help and assistance in searching for information that is pertinent to their skill or to their centers of interest.

It is also aimed at optimizing the display of results, in order to facilitate reading according to specific and preestablished reading screens.

Finally, it is aimed at presenting the documents according to a classification that is more satisfactory for the community of users and that improves the search time as well as the time for reading the said results by comparison with prior art search tools.

Thus the present invention relates to a search method for searching, in a plurality of data sources, each possessing metadata structured according to a chosen structure, for information contents intended for at least one chosen community of users.

According to a general definition of the invention, the method comprises a mode of defining at least one reading screen specific to a community of users and provided with at least one category of results, which is a function of the structure of the metadata of each data source, and a mode of using the specific reading screen predefined in this way as a search filter and/or display format in a search conducted in the plurality of data sources for the said community of users.

Such a method has the advantage that pertinent documents can be found rapidly in a large and heterogeneous mass of information. Thus there results a gain in search and reading time as well as an improvement of the pertinence of the results.

In practice, the reading screen comprises a plurality of categories ordered according to a chosen hierarchical relationship.

According to one embodiment, the mode of defining the reading screen comprises the following steps:

a) defining at least one community of users according to at least one element shared by the said users of the said community;

b) for the community defined in this way, defining at least one data source according to at least one parameter relating to the said data source and/or to the said community;

c) for the data source defined in this way, searching for at least one metadata with which at least one category can be defined;

d) if the search is positive with regard to the metadata, defining at least one rule of correspondence between the category and the metadata obtained in this way;

e) applying the correspondence rule defined in this way to at least one part of the information contents of the data source and associating the document contents that verify the said correspondence rule with the said category; and f) repeating steps a) to e) for at least certain metadata of each data source and obtaining at least one category, which is a function of the structure of the metadata of each data source and forms a predefined reading screen specific to the community of users for the said plurality of data sources.

In practice, the data sources are heterogeneous.

For example, the data sources belong to the group formed by internal databases, external databases, internal knowledge management applications, document management applications, supplier contents.

According to one embodiment, the common element of a community of users belongs to the group formed by a center of interest, a project, a tool, a database, a method, a technique, a skill, an expertise.

According to another aspect of the invention, the mode of defining preestablished and specific reading screens is installed via a unique access module positioned between the chosen community of users and the said plurality of data sources.

According to yet another aspect of the invention, the parameter relating to the data source derives from the skill analysis of the community of users.

Another object of the present invention is a search tool comprising a search server.

According to another aspect of the invention, the search server comprises:

an access module for receiving requests originating from a community of users and capable of transmitting results to the said users of the community;

a plurality of data sources, each possessing metadata structured according to a chosen structure and each connected to the access module;

a module for preliminary definition of at least one reading screen specific to the community of users and provided with at least one category, which is a function of the structure of the metadata of each data source; and a search module capable of using the said specific reading screen defined in this way as a search filter and/or display format in a search conducted in the plurality of data sources for the benefit of the community of users.

In practice, the definition module comprises, for at least one given community of users:

means for searching for at least one data source, at least one metadata of the source making it possible to define at least one category;

appropriate processing means, if the search was positive with regard to the metadata:

for defining at least one rule of correspondence between the category and the metadata obtained in this way and applying the correspondence rule defined in this way to at least part of the results of the data source and associating the results that verify the said correspondence rule with the said category; and for repeating the processing for at least certain metadata of each data source in order to obtain a specific reading screen applicable to the plurality of data sources and provided with at least one category, which is a function of the structure of the metadata of the said data sources.

Another object of the present invention is an information medium that can be read by an information-processing system and that may be completely or partly removable, especially a CD ROM or a magnetic medium, such as a hard disk or floppy, or a transmittable medium, such as an electric or optical signal, containing instructions of a computer program permitting implementation of the search method mentioned hereinabove when this program is loaded and executed by an information-processing system.

Finally, another object of the present invention is a computer program stored on an information medium, the said program containing instructions for implementation of the search method mentioned hereinabove when this program is loaded and executed by an information-processing system.

Figure 2:
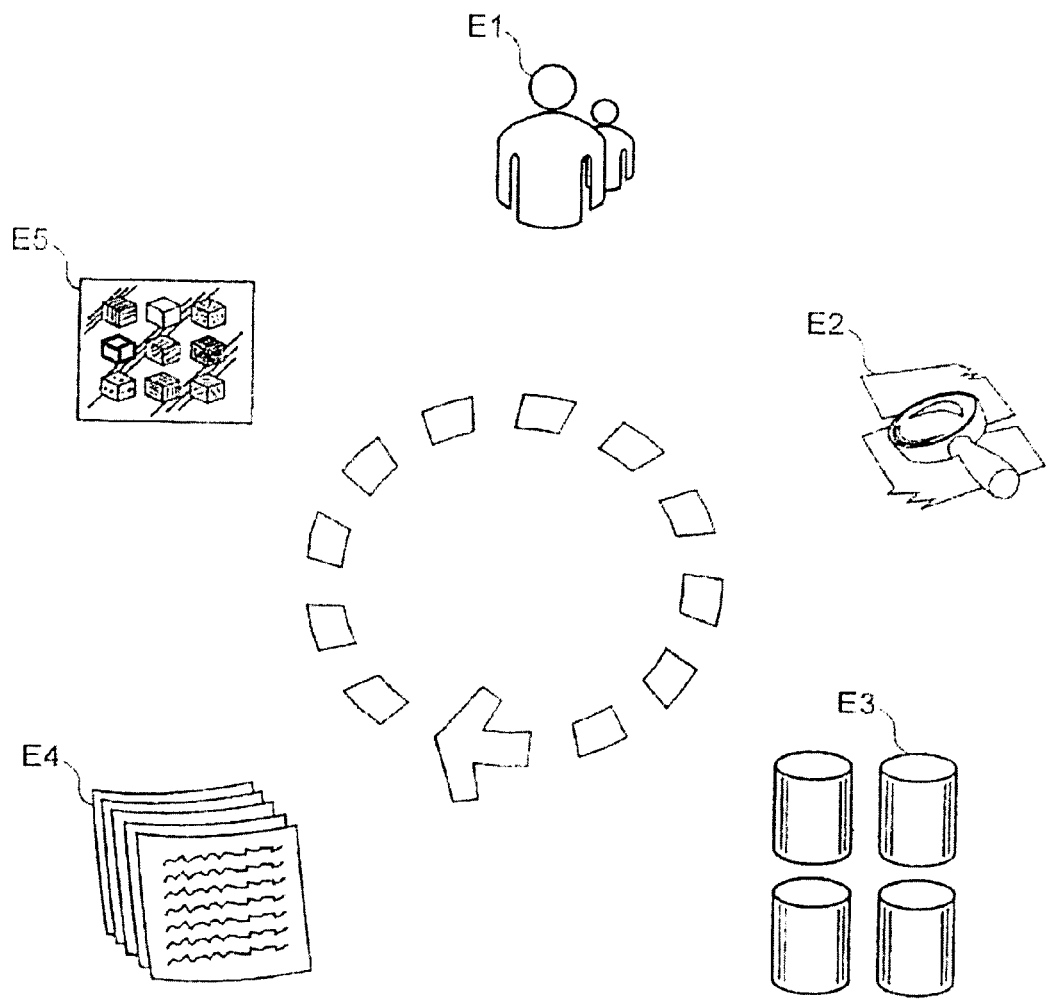
Figure 3:
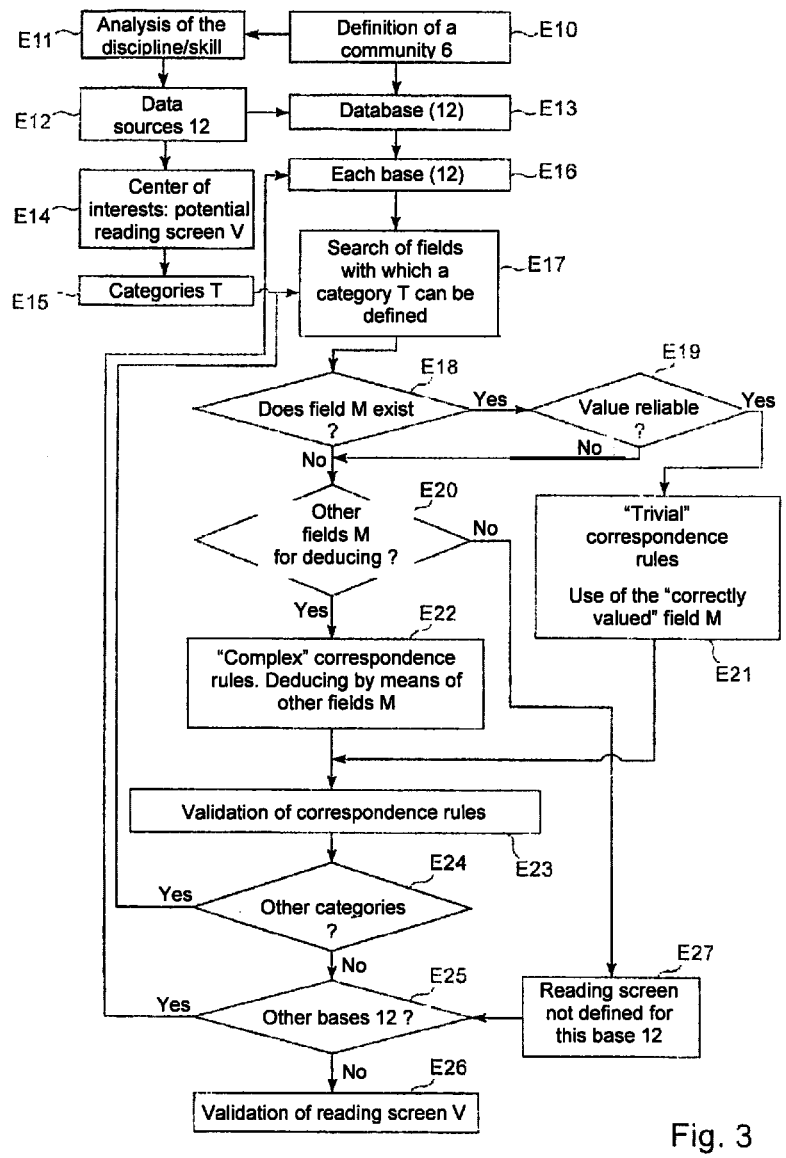
Figure 4A:
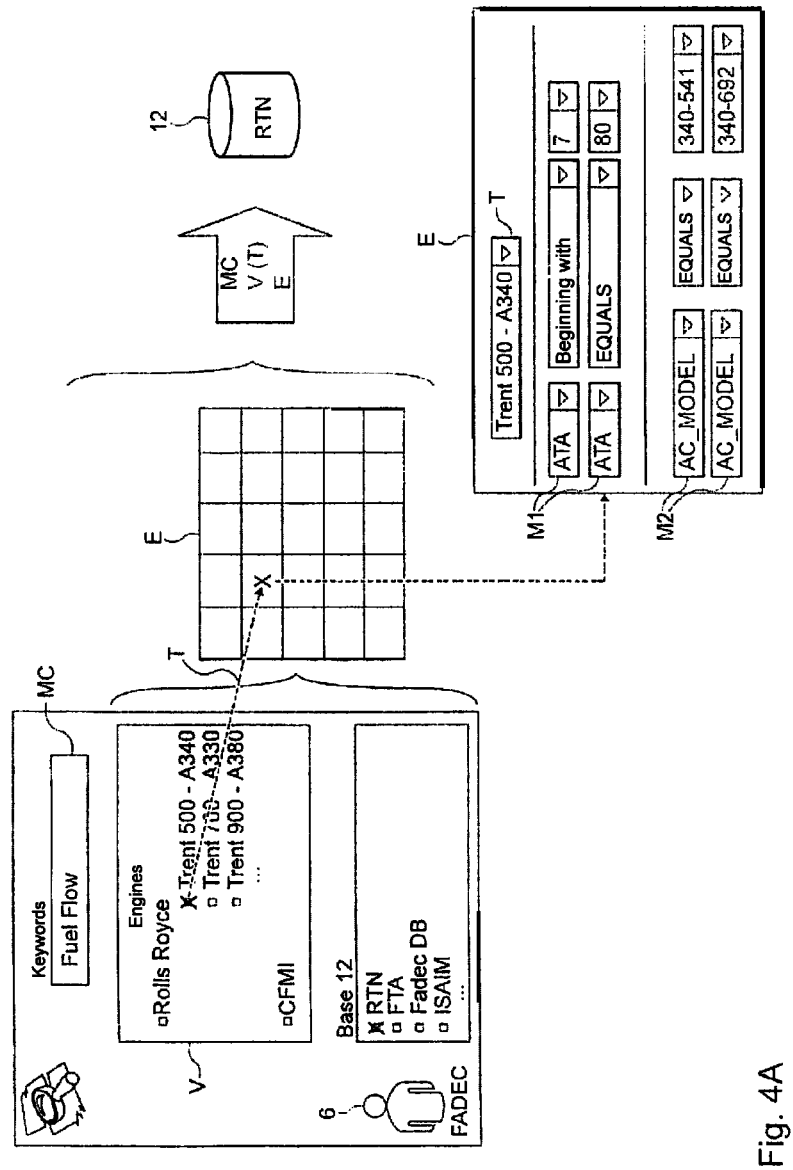
Figure 4B:
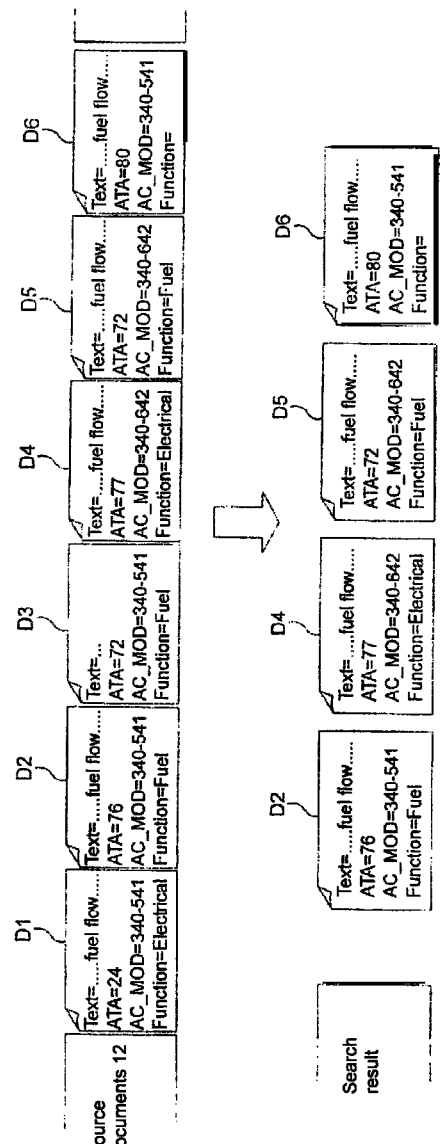

Other characteristics and advantages of the invention will become apparent in the light of the detailed description hereinafter and of the drawings, wherein:

FIG. 1 schematically represents an installation architecture with which the search method according to the invention can be implemented;

FIG. 2 schematically illustrates the essential functions of the search method according to the invention;

FIG. 3 is a flow diagram illustrating the steps of the module for defining specific and preestablished reading screens according to the invention; and FIGS. 4A and 4B represent an example of a reading screen according to the invention and illustrate the use of such a screen as a search criterion and display format in a search conducted in a chosen data source for the benefit of a chosen community of users according to the invention.

Referring to FIG. 1, the search method comprises a search server 2 containing a plurality of modules. An access module 3 makes it possible to receive requests 4 originating from users of a community 6. Access module 3 transmits results 8 to the users of the said community via information-processing tools of the type of microprocessors 10 of traditional technology.

Access module 3 is interposed between microprocessors 10 of community 6 of users and a plurality of data sources 12, each possessing metadata structured according to a chosen structure and each connected to access module 3.

Data sources 12 can be supplier contents 12A, knowledge management applications 12B, document management applications 12C, knowledge sources 12D, internal skill bases 12E.

As indicated hereinabove, data sources 12 are heterogeneous here, meaning that they do not necessarily have a common data structure.

For example, the data sources are of the type "Oracle", "DB2", "Lotus", "Verity", "Filnet", "Windchill", "Plumtree", "SAP" (trade names).

As will be seen in more detail hereinafter, the search tool makes it possible to search in the plurality of data sources 12 or in a subset of one of databases 12.

As will be seen in more detail hereinafter, the search tool according to the invention constitutes an access tool adapted for a chosen community of users (step E1, FIG. 2).

The search tool also constitutes a search assistant as a complement to keywords by furnishing preestablished reading screens that are specific to the community and that can be used as filters during the search conducted by categories and keywords (step E2, FIG. 2).

The search tool is additionally capable of searching documents in selected databases belonging to heterogeneous sources (step E3, FIG. 2).

By virtue of reading screens, the search tool also makes it possible to furnish consolidated search results having significant pertinence (step E4, FIG. 2).

Finally, by virtue of preestablished and specific reading screens, the results are displayed in organized manner with improved visualization, by virtue of a classification using the said reading screens (step E5, FIG. 2).

Referring to FIG. 3, the search according to the invention uses a mode of defining screens for reading document contents specific to a chosen community of users.

As will be seen in more detail hereinafter, this reading screen comprises one or more categories of document contents ordered according to a chosen hierarchical relationship, defined as a function of the structure of the metadata of each data source in which the search is conducted.

As seen hereinabove, the search tool will use these specific and predefined search screens as a complement to keywords as search filters and/or display formats in a document content search conducted by categories and keywords in the plurality of data sources.

Referring to FIG. 3, the method first defines a community of users (step E10). This definition of a community is carried out according to a center of interest, a project, a tool, a database, a method, a technique, a skill, an expertise or a criterion of common membership in the set of users of the community.

Thus the community is defined as a group of persons sharing centers of interest, projects, using databases, tools, techniques or methods.

For a community defined in this way, it is provided at the end of step E10 that at least one data source will be identified or defined (step E12). This identification is achieved according to a parameter relating to the said source and/or to the community, for example on the basis of an analysis of the skill (step E11).

From data source 12 identified in this way, it is possible to deduce the corresponding data base, in step E13.

As a function of the centers of interest of the community, it is possible to define certain already existing potential reading screens V (step E14), also known as points of view or viewpoints.

The reading screens or viewpoints V are composed of categories T classified hierarchically according to a tree or tree structure deduced as a function of the structure of the metadata M of databases and/or of data sources 12.

In this way the method creates a list or directory of databases 12 that are potentially usable or have already been used by the community.

Following step E14, the method deduces the categories T belonging to the potential reading screens V originating from the centers of interest of the community of users (step E15).

For the data source defined in this way (step E16), there is scheduled a search (step E17) of at least one metadata M with which a category T of document contents can be defined.

If the search for the metadata is positive (positive test, step E18), there is defined at least one rule of correspondence between the category T and the metadata M obtained in this way.

By virtue of knowledge of the structure of the metadata of the databases (table, structure), the method identifies the usable fields.

Here the method consists in identifying the metadata M that can correspond to one or more categories T. If the metadata M is not available or is not reliable (negative test, step E19), there are identified other metadata M for deducing the corresponding metadata by means of correspondence rules E.

These correspondence rules E can be of simple or trivial type (step E21), in which there is used the field that is correctly valued.

The correspondence rule E may be more complex (step E22), in which the correspondence rule E is deduced by means of other fields or of other metadata M.

Thus, if the metadata M exists, there is used the value of the field or a part of this value according to a simple or complex correspondence rule E.

As will be seen in more detail hereinafter, these correspondence rules E are constructed by means of a management tool known as query builder.

After validation of the correspondence rules E by the community C (optional step E23), there is obtained a set of categories T known as reading screens V, points of view or viewpoints, ordered relative to one another according to a chosen hierarchical relationship, which is deduced as a function of the structure of the metadata.

This operation is reiterated for each category T (step E24), in each database 12 (step E25).

At the end of exploration of all databases 12, the reading screen V is validated (step E26) for the community 6 of users.

It may happen that, during step E20, no reading screen V is defined for the current database 12 (step E27).

Each database 12 is therefore reviewed to identify the fields M with which each category T can be defined. For this purpose there is used the knowledge of the structure of the databases, if necessary by means of the skill or data-processing representative of this base.

The model of data processed by the method according to the invention is of the relational database type. For example, referring to FIG. 1, a community 6 of users has available several data sources 12, to which there are connected adapters (not illustrated) specific to each base 12. Each community 6 of users has available reading screens V or viewpoints, which function as search filters and/or as grouping criteria for displays. The equations E of correspondence and of correspondence rules are defined and generated by a management tool known as query builder. User requests 4 will therefore be used for both display and filtering. The requests or queries are therefore processed according to equations established in base 12.

A portion of database 12 may be used. This portion is also known as a report.

Equations E, also known as mapping rules, are trivial or complex sets of correspondence rules that define categories T. As seen hereinabove, a reading screen V is a set of categories T with tree structure. These equations make it possible to facilitate maintenance in the case of evolution or change of structure of the databases.

In practice, the correspondence rules are calculated as a function of data relating to the community 6 of users, of data relating to database 12, of data relating to the reading screen V and if necessary of data relating to the subset of the database. Each category T belonging to a reading screen V is defined (FIG. 3) by means of one or more metadata M, according to conditions to be verified, and of operators. The operators can be Boolean operators AND, OR, "equals" or "does not equal".

Referring to FIGS. 4A and 4B, there was illustrated an example of reading screens and the use of such a screen as a search criterion and display format in a search conducted in a chosen data source according to the invention.

Referring to FIG. 4A, there was illustrated an example of a search using a reading screen V (engines) defined according to the invention with reference to FIG. 3.

Firstly a keyword MC is defined. In this case the keyword is "fuel flow". The user then chooses a reading screen, in this case viewpoint V that equals "engines". This reading screen V in this case comprises two main categories, "Rolls Royce" and "CFMI". The "Rolls Royce" category comprises the subcategories "Trent 500-A340", "Trent 700-A330" and "Trent 900-A380".

The community 6 of users is in this case the community named "fadec", and the data sources 12 are selected from among the databases "RTN", "FTA", "fadecDB" and "ISAIM".

In this case the user of the community selects the category T=Trent 500-A340.

In this case, therefore, the user's request comprises the keyword MC, the reading screen V associated with its correspondence rule E, which will point to the database 12 selected by him, in this case the database 12=RTN.

By virtue of the correspondence rule E, which defines a part of the reading screen V, the documents RTN and the fields M1=ATA and M2=AC_model will be used.

The search is conducted for the community 6=fadec in the database 12=RTN with the reading screen V=engines in the category T=Trent 500-A340.

The correspondence rule makes it possible to associate, according to the equations established by the query builder, all the documents that satisfy the condition M1=ATA beginning with 7 or equal to 80, as well as the fields M2=AC_model equal to 340-541 or AC_model equal to 340-642. This equation is implemented in XML text format in the search server.

Referring to FIG. 4B, database 12 (RTN) contains several documents, especially the six documents D denoted individually as D1 to D6. In this way, reading screen V makes it possible to create a search criterion with the type V=engines and the value T=Trent 500-A340. It is known that this value T=Trent 500-A340 corresponds to the metadata M1=ATA beginning with 7 or M1=ATA equal to 80, or M2=AC_model beginning with 340-541 or M2=AC_model equal to 340-642.

The search result reveals four documents. It is evident that document D3 is eliminated, inasmuch as the keyword "fuel flow" is not present in the document, as is document D1, in which the field M1 (ATA) does not begin with 7 or does not equal 80, but in this case equals 24.

Quite obviously the reading screens V according to the invention can serve several communities of users. Similarly, one user can combine several reading screens as search criteria.

As regards the display of results, the reading screens according to the invention additionally offer the user a display format derived from the said reading screens. For example, referring to FIG. 4B, the results can be classified according to the reading screens "function", "ATA", "engines". There results a classification of results that is more pertinent and specific to the community of users.

The invention claimed:

1. A method of searching for information contents in a plurality of data sources, the method comprising:

creating, by a computer processor, a list of a plurality of data sources that have been previously searched through by at least one community of users, each of the plurality of data sources including metadata structured according to a structure, the information contents being intended for the at least one community of users;

first defining, by the computer processor, at least one reading screen specific to the at least one community of users, the at least one reading screen including at least one category of search results ordered as a function of the structure of at least one metadata and including the created list of the plurality of data sources, the first defining of the at least one reading screen further including second defining a correspondence rule between the at least one category and the at least one metadata for associating the information contents to the at least one category; and using, by the computer processor, the defined at least one reading screen as at least one of a search filter and a display format in a search conducted in the plurality of data sources, which are included in the created list, for the community of users, wherein the community of users includes two or more users sharing at least one element belonging to a group formed by at least one of a center of interest, a skill, and an expertise.

2. The method according to claim 1, wherein the defined at least one reading screen is provided with a plurality of categories ordered according to a chosen hierarchical relationship.

3. The method according to claim 1, wherein the first defining of the at least one reading screen further includes:
   third defining, for the at least one community of users, at least one data source of the plurality of data sources in the created list according to at least one parameter relating to the at least one data source;
   searching, in the at least one data source, for the at least one metadata with which at least one category of document contents is defined; and
   repeating the third defining, the searching, and the second defining for at least certain metadata of each data source of the plurality of data sources in the created list, and
   obtaining at least one category, which is a function of a structure of the certain metadata of each data source and forms a predefined reading screen specific to the at least one community of users for the plurality of data sources in the created list.

4. The method according to claim 3, wherein the at least one parameter relating to the at least one data source derives from an analysis of a skill of the community of users.

5. The method according to claim 1, wherein the plurality of data sources are heterogeneous.

6. The method according to claim 5, wherein the plurality of data sources belong to a group formed by internal databases, internal knowledge management applications, document management applications, external supplier contents, and internal knowledge sources.

7. The method according to claim 1, wherein the defined at least one reading screen is installed via a unique access module which is positioned between the at least one community of users and the plurality of data sources in the created list.

8. The method according to claim 1, further comprising:
   searching, in at least one data source of the plurality of data sources in the created list, for a metadata with which a category of document contents is defined;
   identifying other metadata in response to the metadata with which the category of document contents is defined not being found; and
   defining a complex correspondence rule between the category of document contents and the other metadata for associating information contents to the category of document contents.

9. A searching device having a computer processor, the searching device comprising:
   an access module, executable by the computer processor, for receiving search requests originating from a community of users, and for transmitting search results to the users of the community;
   a plurality of data sources, each including metadata structured according to a structure and each connected to the access module;
   a list-creating module, executable by the computer processor, for creating a list of a plurality of data sources that have been previously searched through by the users of the community;
   a defining module, executable by the computer processor, for first defining at least one reading screen specific to the community of users, the at least one reading screen including at least one category of the search results ordered as a function of a structure of at least one metadata and including the created list of the plurality of data sources, and for second defining a correspondence rule between the at least one category and the at least one metadata for associating information contents to the at least one category; and
   a search module, executable by the computer processor, for using the defined at least one reading screen as at least one of a search filter and a display format in a search conducted in the plurality of data sources, which are included in the created list, for the community of users, wherein the community of users includes two or more users sharing at least one element belonging to a group formed by at least one of a center of interest, a skill, and an expertise.

10. The searching device according to claim 9, wherein the defining module is further configured for;
   third defining, for the community of users, at least one data source of the plurality of data sources in the created list according to at least one parameter relating to the at least one data source in the created list;
   searching, in the plurality of data sources in the created list, for the at least one metadata with which at least one category of document contents is defined; and
   repeating the third defining, the searching, and the second defining for at least certain metadata of each data source of the plurality of data sources in the created list in order to obtain at least one of a specific search and a display screen applicable to the plurality of data sources in the created list and provided with the at least one category, which is a function of the structure of the certain metadata of the plurality data sources in the created list.

11. A non-transitory computer-readable storage medium including computer executable instructions executable by a computer causing the computer to perform a method of searching for information contents in a plurality of data sources, the method comprising:
   creating, by a computer processor, a list of a plurality of data sources that have been previously searched through by at least one community of users, each of the plurality of data sources including metadata structured according to a structure, the information contents being intended for the at least one community of users;
   first defining, by the computer processor, at least one reading screen specific to the at least one community of users, the at least one reading screen including at least one category of search results ordered as a function of the structure of at least one metadata and including the created list of the plurality of data sources, the first defining of the at least one reading screen further including second defining a correspondence rule between the at least one category and the at least one metadata for associating the information contents to the at least one category; and
   using, by the computer processor, the defined at least one reading screen as at least one of a search filter and a display format in a search conducted in the plurality of data sources, which are included in the created list, for the community of users, wherein the community of users includes two or more users sharing at least one element belonging to a group formed by at least one of a center of interest, a skill, and an expertise.

* * * * *